(12) United States Patent
Choi et al.

(10) Patent No.: US 9,766,514 B2
(45) Date of Patent: Sep. 19, 2017

(54) LIQUID CRYSTAL DISPLAY DEVICE WITH GAP SPACER AND PUSH SPACER AND METHOD OF FABRICATING THE SAME

(71) Applicant: LG Display Co., Ltd., Seoul (KR)

(72) Inventors: Hyongjong Choi, Paju-si (KR); Youngjik Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 125 days.

(21) Appl. No.: 14/558,969

(22) Filed: Dec. 3, 2014

(65) Prior Publication Data

US 2015/0185566 A1 Jul. 2, 2015

(30) Foreign Application Priority Data

Dec. 31, 2013 (KR) .......................... 10-2013-0168607

(51) Int. Cl.
| | | |
|---|---|---|
| G02F 1/1343 | (2006.01) | |
| G02F 1/1335 | (2006.01) | |
| G02F 1/1339 | (2006.01) | |
| G02F 1/1362 | (2006.01) | |
| G02F 1/1368 | (2006.01) | |

(52) U.S. Cl.
CPC ...... *G02F 1/134363* (2013.01); *G02F 1/1368* (2013.01); *G02F 1/13394* (2013.01); *G02F 1/133514* (2013.01); *G02F 1/134336* (2013.01); *G02F 1/136227* (2013.01); *G02F 1/136286* (2013.01); *G02F 1/133512* (2013.01);
(Continued)

(58) Field of Classification Search
CPC ......... G02F 1/134363; G02F 1/136286; G02F 1/13394; G02F 1/134336; G02F 2001/13396
See application file for complete search history.

(56) References Cited

U.S. PATENT DOCUMENTS

| | | |
|---|---|---|
| 2007/0069204 A1 | 3/2007 | Jang et al. |
| 2007/0121054 A1* | 5/2007 | Jang ...................... G02F 1/1341 349/187 |

(Continued)

FOREIGN PATENT DOCUMENTS

WO WO2013179237 * 12/2013

OTHER PUBLICATIONS

Search Report dated May 28, 2015, issued by the European Patent Office in European Patent Application No. 14169957.9.

*Primary Examiner* — Paul Lee
(74) *Attorney, Agent, or Firm* — Morgan, Lewis & Bockius LLP (57) ABSTRACT

Provided are a liquid crystal display (LCD) device with a gap spacer and a push spacer, and a method of fabricating the same. The liquid crystal display device includes: a lower substrate, including: a plurality of pixel areas disposed in a matrix manner, a non-aperture area surrounding at least one of the pixel areas, an aperture area surrounded by the non-aperture area, a contact hole area within the non-aperture area, a first color filter disposed on the non-aperture area and the aperture area of a first subpixel, except in the contact area, and a second color filter disposed on the non-aperture area and the aperture area of a second subpixel, except in the contact area, an upper substrate including, at the non-aperture area: a gap column spacer, and a push column spacer, and a liquid crystal layer disposed between the lower substrate and the upper substrate.

20 Claims, 8 Drawing Sheets

(52) U.S. Cl.
CPC .............. *G02F 2001/13396* (2013.01); *G02F 2001/133519* (2013.01); *G02F 2001/136222* (2013.01)

(56) References Cited

U.S. PATENT DOCUMENTS

| | | | | |
|---|---|---|---|---|
| 2009/0115947 A1* | 5/2009 | Huang | ................ | G02F 1/13394 349/106 |
| 2009/0231522 A1* | 9/2009 | Kim | ................... | G02F 1/13394 349/106 |
| 2009/0323007 A1* | 12/2009 | Shim | ................... | G02F 1/13394 349/155 |
| 2010/0110022 A1* | 5/2010 | Chen | ................... | G06F 3/0414 345/173 |
| 2012/0013818 A1* | 1/2012 | Park | ..................... | G06F 1/1601 349/58 |
| 2012/0081640 A1 | 4/2012 | Kim et al. | | |

\* cited by examiner

FIG. 1

(Related Art)

FIG. 2

(Related Art)

LIQUID CRYSTAL DISPLAY DEVICE WITH GAP SPACER AND PUSH SPACER AND METHOD OF FABRICATING THE SAME

CROSS-REFERENCE TO RELATED APPLICATION(S)

The present application claims benefit and priority under 35 U.S.C. §119(a) of Korean Patent Application No. 10-2013-0168607, filed on Dec. 31, 2013, the entire disclosure of which is hereby incorporated by reference herein for all purposes.

BACKGROUND

1. Technical Field

The following description relates to a liquid crystal display (LCD) device with a gap spacer for maintaining the cell gap at normal condition and a push spacer (or, Knocking spacer) for maintaining the cell gap when the device is pushed, and method of fabricating the same. Furthermore, the following description relates to a liquid crystal display including a first substrate including a thin film transistor and a color filter, and a second substrate including a gap spacer and a push spacer.

2. Discussion of the Related Art

A liquid crystal display (LCD) device represents video data by controlling the light transmissivity of the liquid crystal layer using the electric fields. According to the direction of the electric field, the LCD can be classified in the two major types: a vertical electric field type and a horizontal electric field type.

For the vertical electric field type LCD, the common electrode formed on the upper substrate and the pixel electrode formed on the lower substrate face each other to form the electric field having a direction perpendicular to the substrate face. The twisted nematic (TN) liquid crystal layer disposed between the upper substrate and the lower substrate is driven by the vertical electric field. The vertical electric field type LCD has an advantage of a higher aperture ratio, while it has a disadvantage of a narrower view angle of about 90° (degrees).

For the horizontal electric field type LCD, the common electrode and the pixel electrode are formed on the same substrate in parallel. The liquid crystal layer disposed between the upper substrate and the lower substrate is driven in an In-Plane-Switching (IPS) mode by the electric field that is parallel to the substrate face. The horizontal electric field type LCD has an advantage of a wider view angle over 160° (degrees) and a faster response speed than the vertical electric field type LCD. Because it often displays a better quality image, the horizontal electric field type LCD is more popular in the market.

Figure 1:
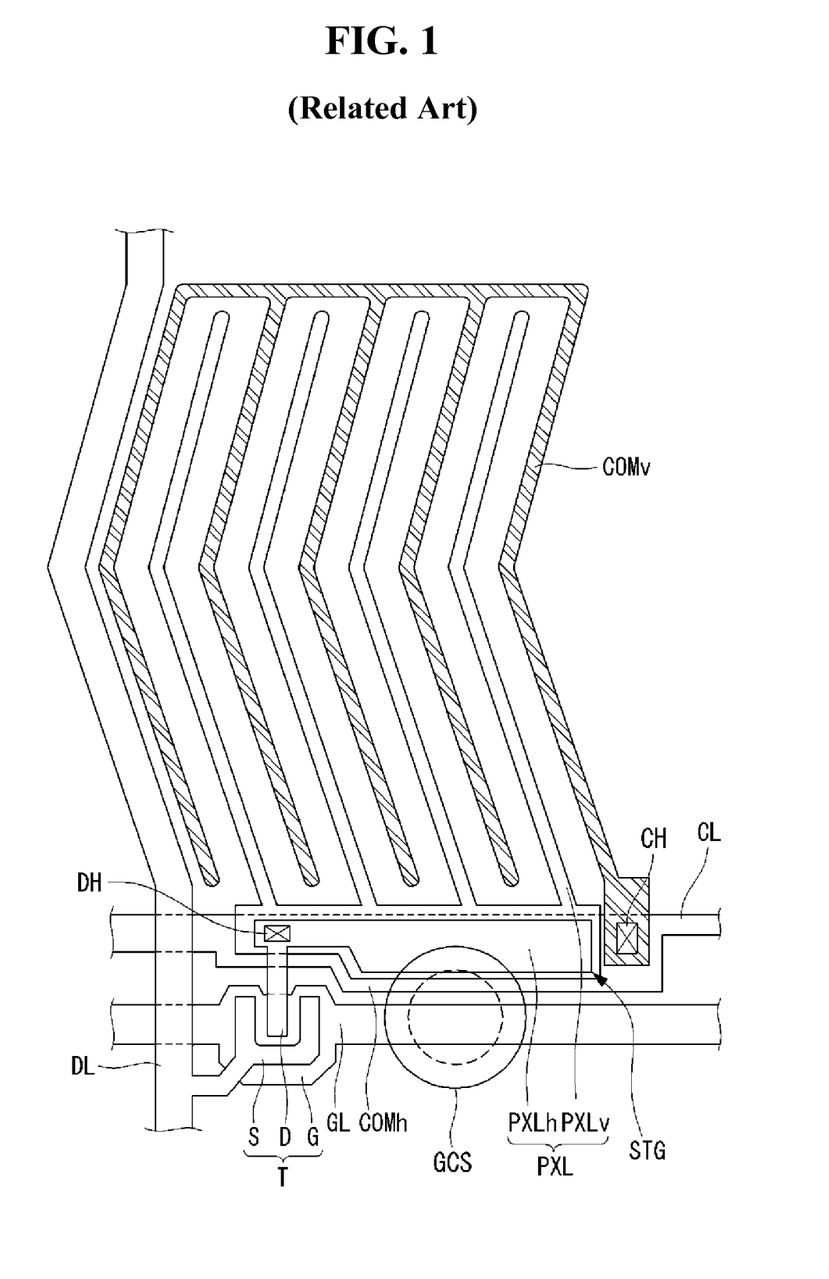
FIG. 1 is a plane view illustrating the thin film transistor substrate of a horizontal electric field type liquid crystal display according to the related art.

Hereinafter, the horizontal electric field type LCD will be explained. The horizontal electric field type liquid crystal display according to the related art comprises a thin film transistor (or, TFT) array substrate, a color filter array substrate, and a liquid crystal layer inserted between these two substrates. FIG. 1 is a plane view illustrating a thin film transistor substrate of the horizontal electric field type liquid crystal display according to the related art.

In the horizontal electric field type liquid crystal display having a thin film transistor substrate, as the pixel electrode and the common electrode are disposed apart from each other with certain distance on the same leveled plane, the video data can be represented by driving the liquid crystal using the horizontal electric field formed between these electrodes. With reference to FIG. 1, the thin film transistor substrate of the horizontal electric field type LCD panel includes a gate line GL and a data line DL crossing each other on a lower substrate, a thin film transistor T formed at the crossing portion of the gate line GL and the data line DL, a pixel electrode PXL and a common electrode COM formed within a pixel area defined by the crossing structure of the gate line GL and the data line DL to form a horizontal electric field, and a common line CL connecting to the common electrode and running parallel with the gate line GL.

The gate line GL supplies the gate signal to the gate electrode G of the thin film transistor T. The data line DL supplies the pixel signal to the pixel electrode PXL through the drain electrode D of the thin film transistor T. The gate line GL and the data line DL are formed in the crossed structure to define the pixel area. The common line CL is formed to be parallel to the gate line GL at one side of the pixel area, and supplies the reference voltage signal for driving the liquid crystal layer to the common electrode.

The thin film transistor T charges and maintains the pixel signal voltage to the pixel electrode PXL by responding to the gate signal of the gate line GL. To do so, the thin film transistor T includes a gate electrode G connected to the gate line GL, a source electrode S connected to the data line DL, and a drain electrode D connected to the pixel electrode PXL. Further, the thin film transistor T may include an active channel layer (not shown) between the source electrode S and the drain electrode D, and an ohmic contact layer (not shown) for keeping the ohmic contact with the source electrode S and the drain electrode D.

The pixel electrode PXL is formed within the pixel area to be connected to the drain electrode D of the thin film transistor T, and exposed via a drain contact hole DH formed through the passivation layer (not shown). Especially, the pixel electrode PXL includes a horizontal pixel electrode PXLh connected to the drain electrode D and is parallel to the neighboring gate line GL, and a plurality of vertical pixel electrodes PXLv branched from the horizontal pixel electrode PXLh that extend in the vertical direction within the pixel area.

The common electrode is connected to the common line CL via a common contact hole CH formed through the gate insulating layer, the passivation layer, and the planarization layer. Some portions of the common electrode that are parallel with the gate line GL having wider width may be a horizontal common electrode COMh. Further, the common electrode includes a plurality of vertical common electrode COMv branched from the horizontal common electrode COMh and extended in the vertical direction within the pixel area. Especially, the vertical pixel electrode PXLv and the vertical common electrode COMv are disposed in parallel with each other within the pixel area.

Therefore, the horizontal electric field is formed between the vertical pixel electrode PXLv supplied with the pixel signal voltage through the thin film transistor T and the vertical common electrode COMv supplied with the reference signal voltage through the common line CL. Due to this horizontal electric field, the liquid crystal molecules of the liquid crystal layer disposed between the thin film transistor array substrate and the color filter substrate are rotated by the dielectric anisotropy. Based on the rotating amount, the light transmittance of the pixel area is altered, and then the video image can be represented.

The thin film transistor substrate is joined with the color filter substrate with the liquid crystal layer therebetween. Here, in order to keep the gap between the thin film transistor substrate and the color filter substrate uniform, a plurality of gap column spacer GCS may be disposed on the inner surface of the color filter substrate. The gap column spacer GCS may be formed to overlap with the non-open area (to not allow the light to pass) where the lines and/or the thin film transistor is formed.

Figure 2:
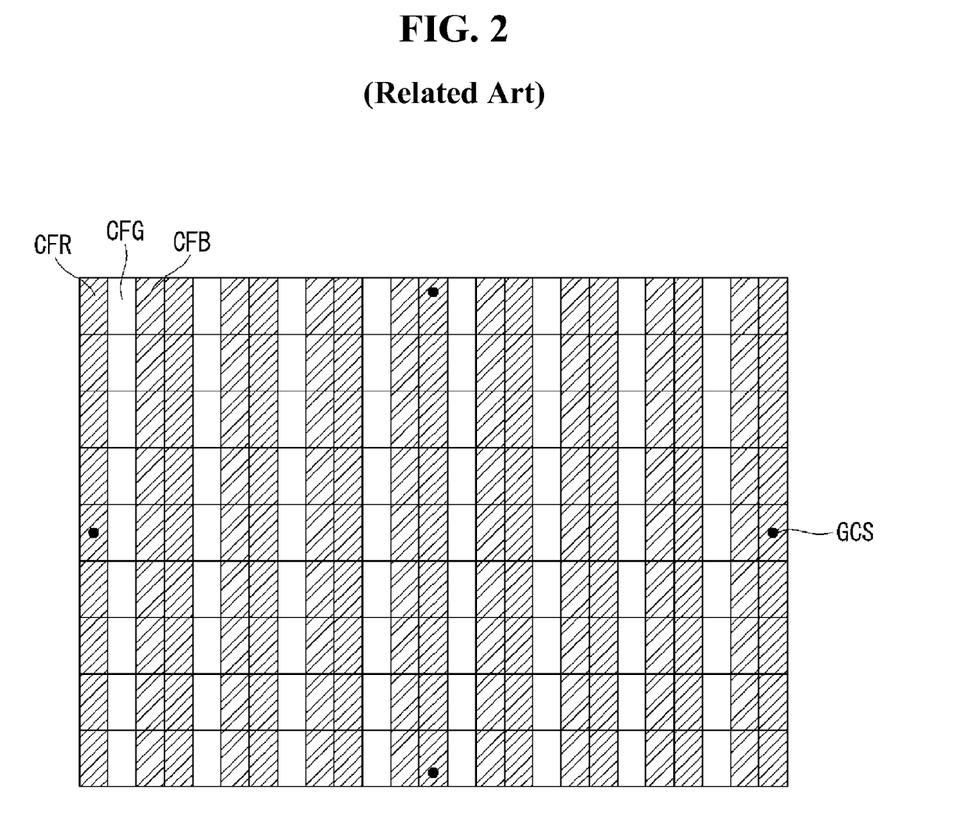
FIG. 2 is a plane view illustrating a distribution of the gap column spacers in the liquid crystal display of FIG. 1.

On the overall area of the liquid crystal display, the gap column spacers GSC would be disposed as being scattered with a proper distribution density. FIG. 2 is a plane view illustrating a distribution of the gap column spacers in the liquid crystal display according to the related art. With reference to FIG. 2, the liquid crystal display includes a plurality of unit pixels disposed in a matrix manner, where each unit pixel has a group of subpixels including a red subpixel, a green subpixel, and a blue subpixel. For example, the red color filters CFR allocated at red subpixels may be disposed along one column, and the green color filters CFG may be disposed along the next column. Further, the blue color filters CFB may be disposed along the next column after the green color filters CFG.

With this pixel array structure, the liquid crystal layer is sandwiched between the thin film transistor substrate and the color filter substrate. A plurality of the gap column spacers GCS are distributed with the liquid crystal layer for maintaining the thickness of the liquid crystal layer (i.e., Cell Gap) in even or uniform condition. FIG. 2 shows an example distribution of the gap column spacers in which four (4) gap column spacers are evenly distributed within a 25×9 pixel array.

Due to the gap column spacer GCS, the thickness between the thin film transistor substrate and the color filter substrate can be maintained in an even and/or uniform condition. However, when a touch panel has been applied to the liquid crystal display, a user may frequently press the surface of the liquid crystal display. In this case, at the area where there is no gap column spacer GCS, the cell gap may not be maintained in uniform condition due to the pressing force of the user's finger (the "touch pressure"). As this touch pressure is not always the same, the cell gap may be severely thinned when the user touches the display surface with a strong pressing force. When these touches are frequently repeated, the display quality may have any unexpected problem or may be damaged.

Therefore, with the exception of the gap spacer for keeping the cell gap in uniform condition, it is desirable to have a means or structure to prevent the cell gap from being severely thinned when the user presses/touches the display surface.

SUMMARY

Accordingly, embodiments of the present application are directed to a liquid crystal display (LCD) device with a gap spacer and a push spacer, and a method of fabricating the same, that substantially obviates one or more problems due to the limitations and disadvantages of the related art.

An object of embodiments is to provide a liquid crystal display having a gap spacer for keeping the cell gap and a push spacer for preventing the cell gap from being thinned severely as the display is pressed. Another object of embodiments is to provide a liquid crystal display including a push spacer including a height lower than that of the gap spacer. Still another object of embodiments is to provide a liquid crystal display including a lower substrate including a thin film transistor and a color filter, and an upper substrate including a gap spacer and a push spacer.

Additional advantages, objects, and features will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a liquid crystal display device, including: a lower substrate, including: a plurality of pixel areas disposed in a matrix manner, a non-aperture area surrounding at least one of the pixel areas, an aperture area surrounded by the non-aperture area, a contact hole area within the non-aperture area, a first color filter disposed on the non-aperture area and the aperture area of a first subpixel, except in the contact area, and a second color filter disposed on the non-aperture area and the aperture area of a second subpixel, except in the contact area, an upper substrate including, at the non-aperture area: a gap column spacer, and a push column spacer, and a liquid crystal layer disposed between the lower substrate and the upper substrate.

In another aspect, there is provided a method of manufacturing a liquid crystal display device, the method including: providing a lower substrate, including: providing a plurality of pixel areas in a matrix manner, providing a non-aperture area surrounding at least one of the pixel areas, providing an aperture area surrounded by the non-aperture area, providing a contact hole area within the non-aperture area, providing a first color filter on the non-aperture area and the aperture area of a first subpixel, except in the contact area, and providing a second color filter on the non-aperture area and the aperture area of a second subpixel, except in the contact area, providing an upper substrate including, at the non-aperture area: providing a gap column spacer, and providing a push column spacer, and providing a liquid crystal layer between the lower substrate and the upper substrate.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, embodiments will be described in detail with reference to the accompanying drawings.

Figure 3:
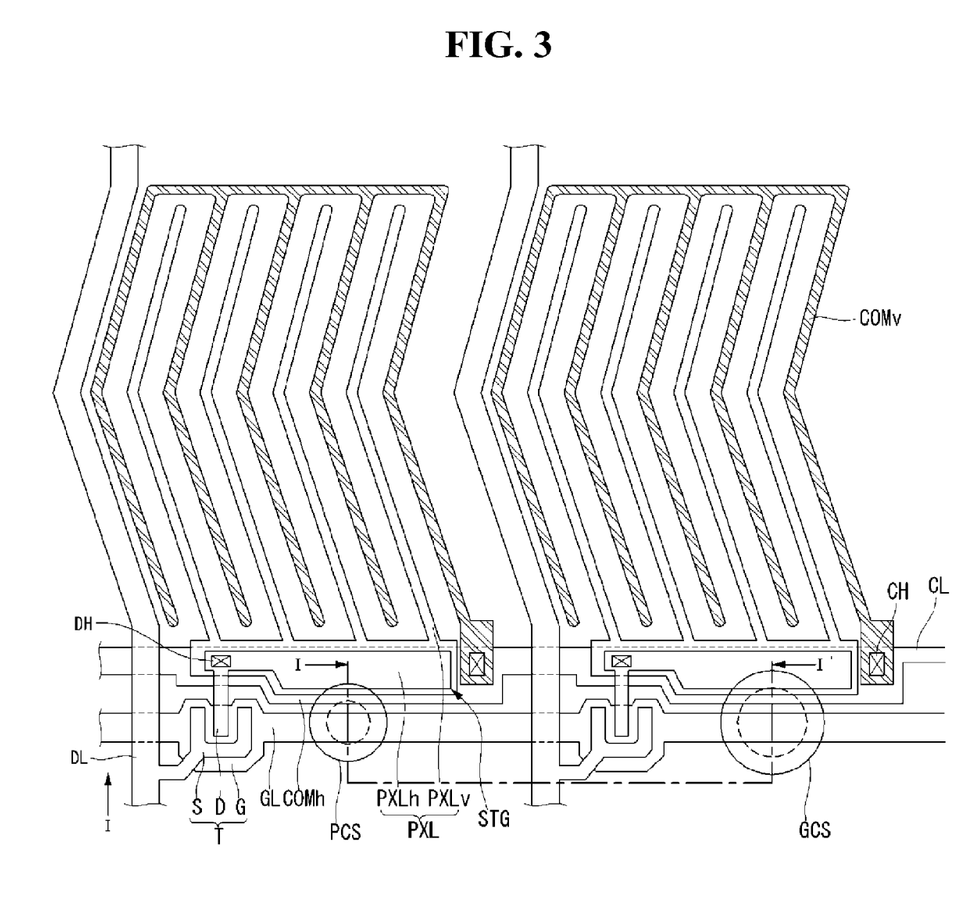
FIG. 3 is a plane view illustrating a structure of a liquid crystal display according to an embodiment.
Figure 4:
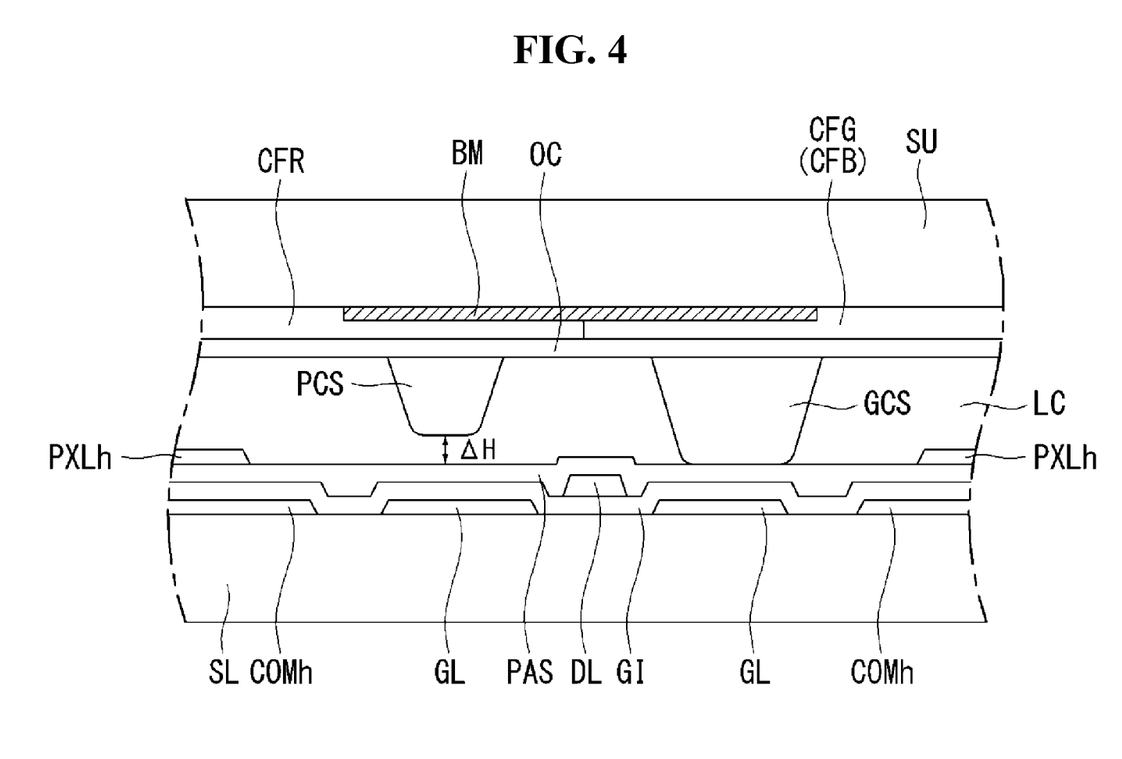
FIG. 4 is a cross-sectional view, along line I-I' of FIG. 3, illustrating a structure of a gap spacer and a push spacer in a liquid crystal display according to an embodiment.
Figure 5:
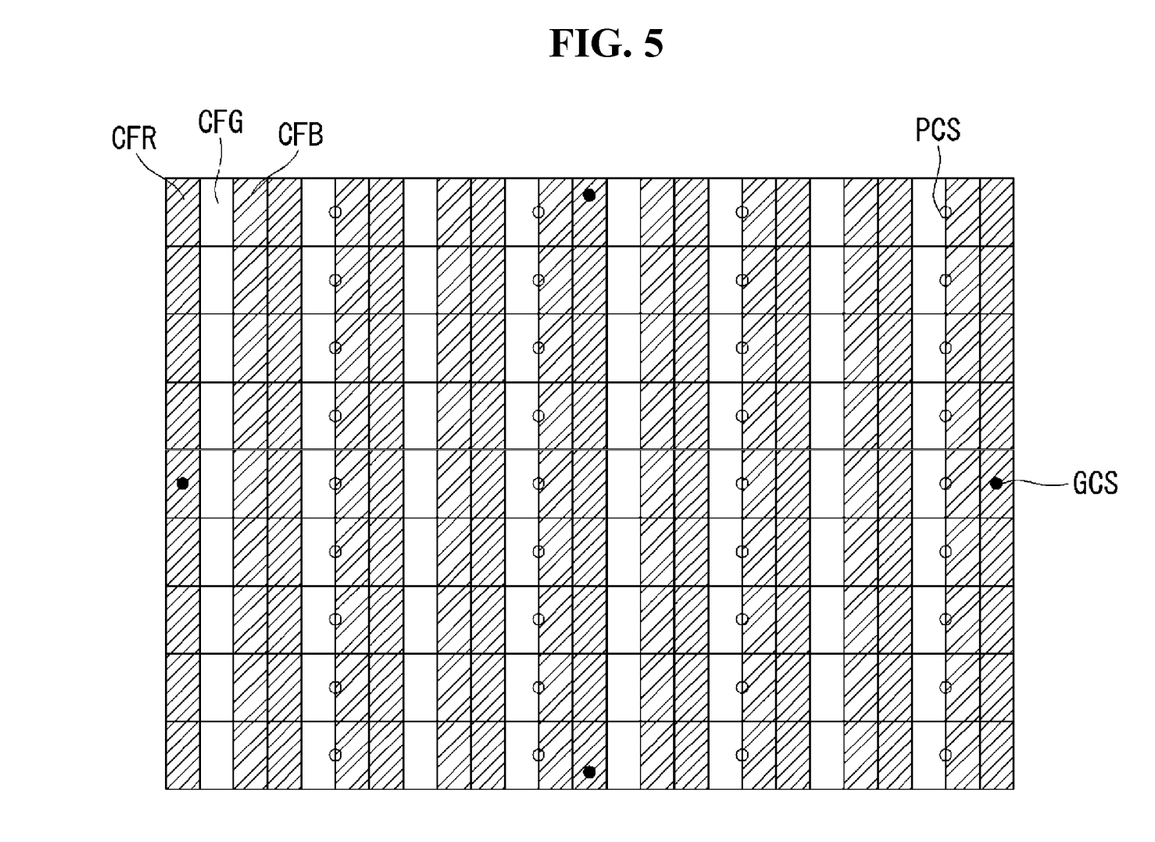
FIG. 5 is a plane view illustrating an example distribution of a plurality of the gap spacers and a plurality of the push spacers in a liquid crystal display according to an embodiment.

FIG. 3 is a plane view illustrating a structure of a liquid crystal display according to an embodiment. FIG. 4 is a cross-sectional view, along line I-I' of FIG. 3, illustrating a structure of a gap spacer and a push spacer in a liquid crystal display according to an embodiment. FIG. 5 is a plane view illustrating an example distribution of a plurality of the gap spacers and a plurality of the push spacers in a liquid crystal display according to an embodiment.

In FIG. 3, two neighboring pixel areas are shown in the drawing. Structures of the liquid crystal display in FIG. 3 that are similar to those of FIG. 1 may not be explained in detail. The explanation may be focused on the main features of embodiments of the present invention, especially the gap column spacer GCS and the push column spacer PCS. With reference to FIG. 3, the liquid crystal display according to an embodiment may include a gap column spacer GCS for keeping the cell gap in uniform condition. Further, it may include a push column spacer PCS for preventing the cell gap from being severely thinned by the pressing force when user touches or presses the surface of the liquid crystal display.

With reference to FIG. 4, the structure of the gap column spacer GCS and the push column spacer PCS will be explained. A gate line GL and a horizontal common electrode COMh may be provided on the lower substrate SL. A gate insulating layer GI may be provided on the gate line GL and the horizontal common electrode COMh. A data line DL may be provided on the gate insulating layer GI to cross with the gate line GL. A passivation layer PAS may be provided on the data line DL to cover an entire surface of the lower substrate SL.

The lower substrate may face with and may be joined with the upper substrate SU, and a liquid crystal layer LC may be disposed between the lower and the upper substrates. A black matrix BM may be formed on the upper substrate SU for defining the pixel areas. Within each of the pixel areas defined by the black matrix BM, a color filter may be formed. For example, for one pixel area, a red color filter CFR may be formed. A green color filter CFG (or a blue color filter CFB) may be formed at another pixel area neighboring to the red pixel area. An overcoat layer OC may be deposited on the color filters to cover an entire surface of the upper substrate SU.

On the overcoat layer OC of the upper substrate SU, there may be disposed a gap column spacer GCS for maintaining the cell gap in a uniform condition and a push column spacer PCS for preventing the cell gap from being severely thinned when the upper substrate SU is pressed and/or touched. The gap column spacer GCS may have a first height corresponding to the cell gap, which may be the properly designed distance between the upper substrate SU and the lower substrate SL. The push column spacer PCS may have a second height slightly lower than the first height of the gap column spacer GCS. In other words, the upper surface of the gap column spacer GCS may contact on the top inner surface of the lower substrate SL. In one example, the upper surface of the push column surface PCS may be spaced apart from the top inner surface of the lower substrate SL by a predetermined distance.

For example, the upper surface of the push column spacer PCS may be separated by about 6,000~7,000 Å from the top inner surface of the lower substrate SL. In one example, when the push column spacer PCS and the gap column spacer GCS are formed near to each other, the height difference ΔH of the first height of the gap spacer GCS and the second height of the push column spacer PCS may be about 6,000~7,000 Å.

As the gap column spacer GCS may maintain the cell gap between the upper substrate SU and the lower substrate SL, the distribution (e.g., scattering) density of the gap column spacer GCS may not be a high value. Rather, the size of the gap column spacer GCS may be designed to ensure sufficient strength. Meanwhile, the push column spacer PCS may sustain the cell gap such that it is severely thinned when the upper substrate SU and the lower substrate SL are pressed/touched to be close each other. Therefore, in one example, the distribution density of the push column spacer PCS may have as high a value as possible. If the push column spacer PCS is designed to have a similar size as that of the gap column spacer GCS, the area occupying ratio (ratio of the total cross-sectional area of the all spacers) of the push column spacer PCS may be larger. This may cause undesirable effects in the display. Therefore, in one example, the push column spacer PCS may be designed to have a smaller size than the gap column spacer GCS.

For example, when the gap column spacer GCS is designed in a truncated cone shape (as illustrated in the FIG. 4 example), the cross-sectional diameter of the lower surface contacting to top inner surface of the upper substrate SU may be about 31.5 μm (micrometers), and the cross-sectional diameter of the upper surface contacting to top inner surface of the lower substrate SL may be 15.4 μm (micrometers). Furthermore, when the push column spacer PCS is designed in a truncated cone shape (as illustrated in the FIG. 4 example), the cross-sectional diameter of the lower surface contacting to top inner surface of the upper substrate SU may be about 29.8 μm (micrometers), and the cross-sectional diameter of the upper surface contacting to top inner surface of the lower substrate SL may be 17.5 μm (micrometers). Because the height of the push column spacer PCS may be lower than that of the gap column spacer GCS, the cross-sectional diameter of the push column spacer PCS may be slightly larger than that of the gap column spacer GCS. In FIG. 3, the solid circle represents the cross-sectional diameter of the lower surface of the spacers, and the dot circle represents the cross-sectional diameter of the upper surface of the spacers.

With reference to FIG. 5, an example for the distribution of the gap column spacer GCS and the push column spacer PCS is described. For the liquid crystal display, a plurality of unit pixels may be disposed in a matrix manner, wherein each of unit pixels may have three subpixels including a red subpixel, a green subpixel, and a blue subpixel. For example, the red color filters CFR allocated at red subpixels may be disposed along one column, and the green color filters CFG may be disposed along the next column. Further, the blue color filters CFB may be disposed along the next column after the green color filters CFG.

With this pixel array structure, the liquid crystal layer LC (FIG. 4) may be sandwiched between the lower substrate SL including the thin film transistor and the pixel electrode and the upper substrate SU including the color filter. A plurality of the gap column spacers GCS may be distributed with the liquid crystal layer LC for maintaining the thickness of the liquid crystal layer (e.g., a "cell gap") in an even or uniform condition over the entire surface of the display panel. FIG. 5 shows an example distribution of the gap column spacers in which, for example, four (4) gap column spacers GCS may be evenly distributed within a 25×9 pixel array. That is, the distribution of the gap column spacer GCS according to an embodiment may be similar to the distribution according to the related art. Further, the liquid crystal display according to an embodiment may include, for example, thirty-six (36) push column spacers PCS within a 25×9 pixel array.

In the liquid crystal display according to an embodiment as shown in the examples in FIGS. 3 and 4, the thin film transistor may be formed on the lower substrate SL, and the color filter may be formed on the upper substrate SU. The gap column spacer GCS and the push column spacer may be formed at the area where the black matrix BM may be formed. As the black matrix BM made of untransparent resin material may also be formed between each color filter, the gap column spacer GCS and the push column spacer PCS may be made of a transparent resin material. In one example, even though they may have different heights, the gap column spacer GSC and the push column spacer PCS may be formed at the same time with a half-tone mask. When a transparent resin material is patterned with a half-tone mask, the height difference of 6,000~7,000 Å between the gap column spacer GCS and the push column spacer PCS may be easily ensured.

In one embodiment, in order to simplify the manufacturing process for the liquid crystal display, the color filter may be formed at the lower substrate with the thin film transistor. In one example, there may be no black matrix on the upper substrate SU, but only the gap column spacer GCS and the push column spacer PCS may be formed on the transparent upper substrate SU. For example, for the ultra high resolution liquid crystal display including greater than 300 ppi, many other things may be considered.

As shown in the FIG. 3 example, in a liquid crystal display including less than 200 ppi resolution, there may be no problem with distributing the gap column spacer GCS and the push column spacer PCS on the area of the gate line GL disposed between each of the pixel rows. However, in an ultra high density used liquid crystal display including less than 300 ppi resolution, the area of the unit pixel may be much smaller. As a result, the distance between the drain contact hole DH and the common contact hole CH may decrease. For the ultra high density liquid crystal display with greater than 300 ppi resolution, it may be difficult to maintain the distance between the contact holes with 32 μm (micrometers) or more. Therefore, it may be difficult to distribute any one of the gap column spacer GCS and the push column spacer PCS between the contact holes in a stable condition.

For example, for the gap column spacer GCS including a lower distribution density, even if it is disposed as overlapping somewhat with the pixel area neighboring the gate line GL area, it may not cause an issue with the brightness or luminescence. However, for the push column spacer PCS including a higher distribution density than that of the gap column spacer GCS, when it is disposed as overlapping with the pixel area, it may cause a reduction of the aperture ratio. As the pixel resolution increases, the pixel size decreases. Therefore, as the push column spacer PCS reduces the aperture ratio, it may also cause severe deterioration of the display quality.

Figure 6:
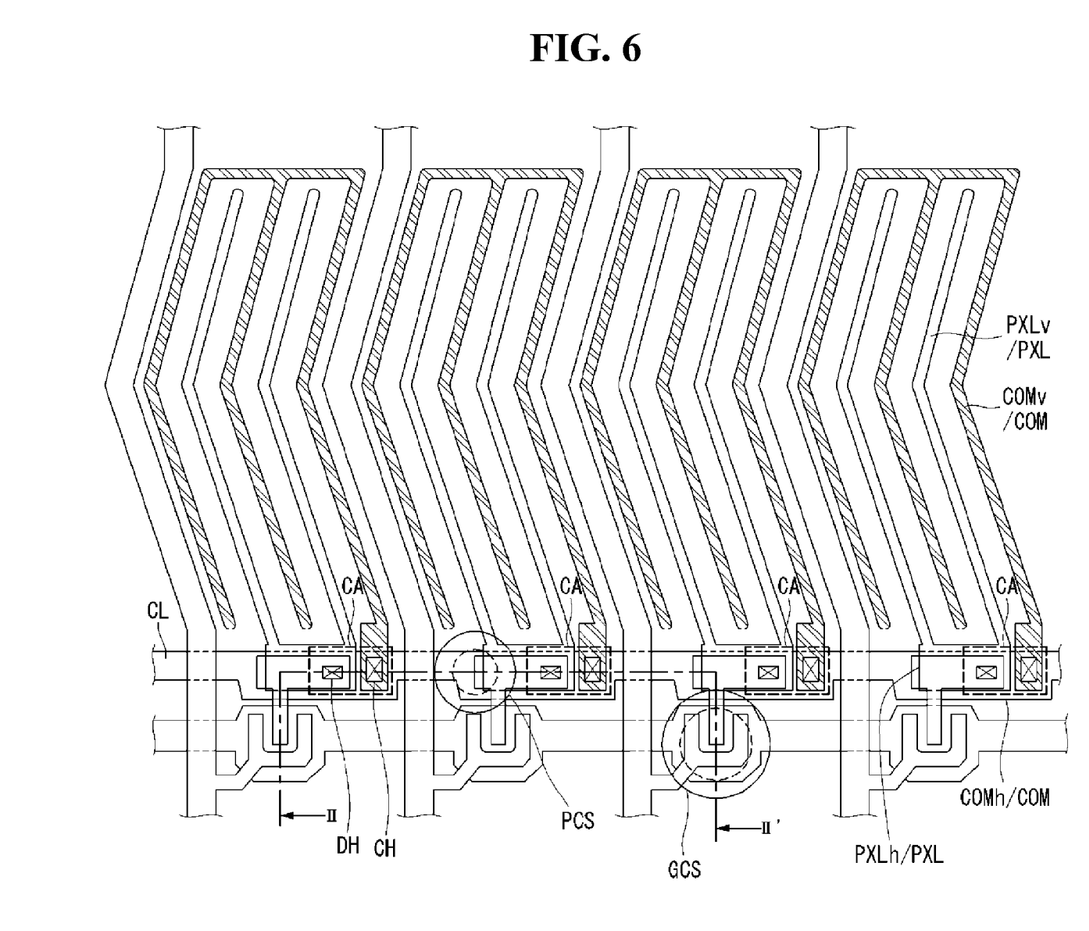
FIG. 6 is a plane view illustrating a structure of a liquid crystal display according to an embodiment.
Figure 7:
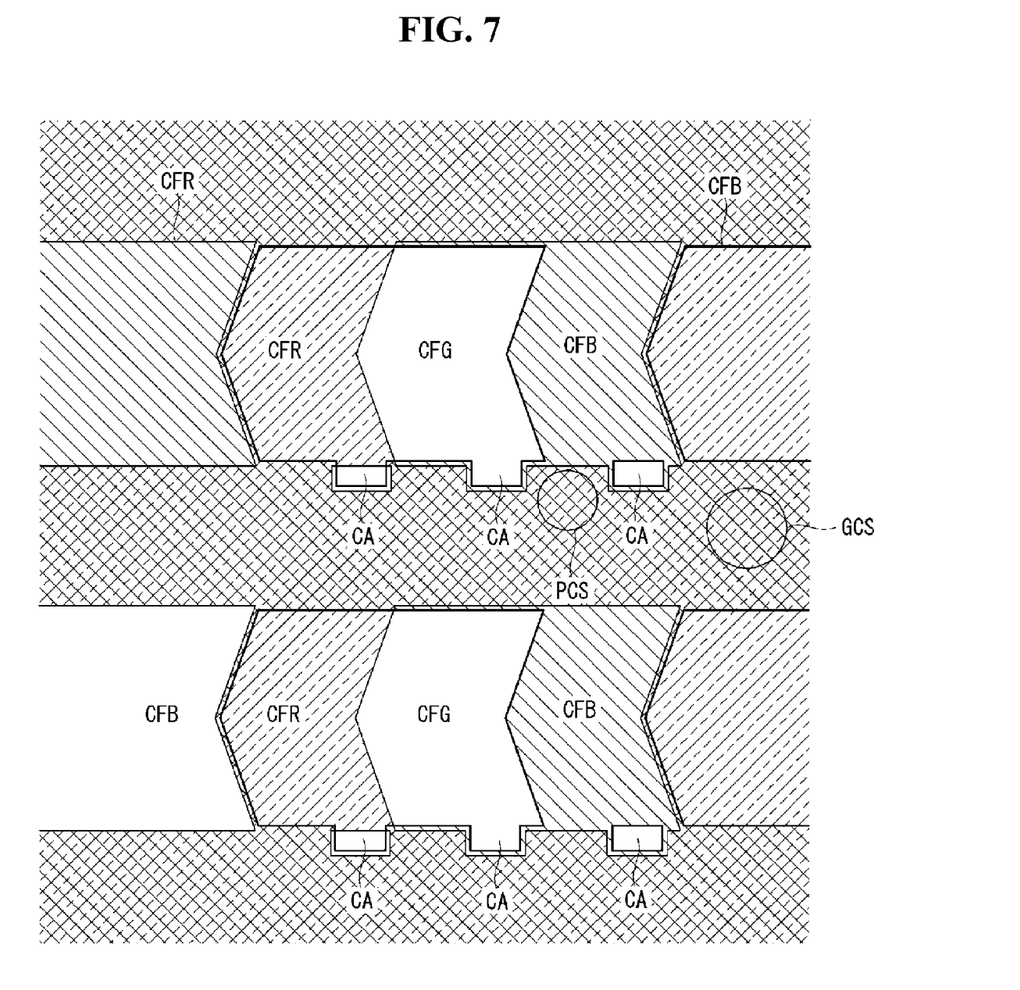
FIG. 7 is a plane view illustrating a structure of color filter array in a liquid crystal display according to an embodiment.
Figure 8:
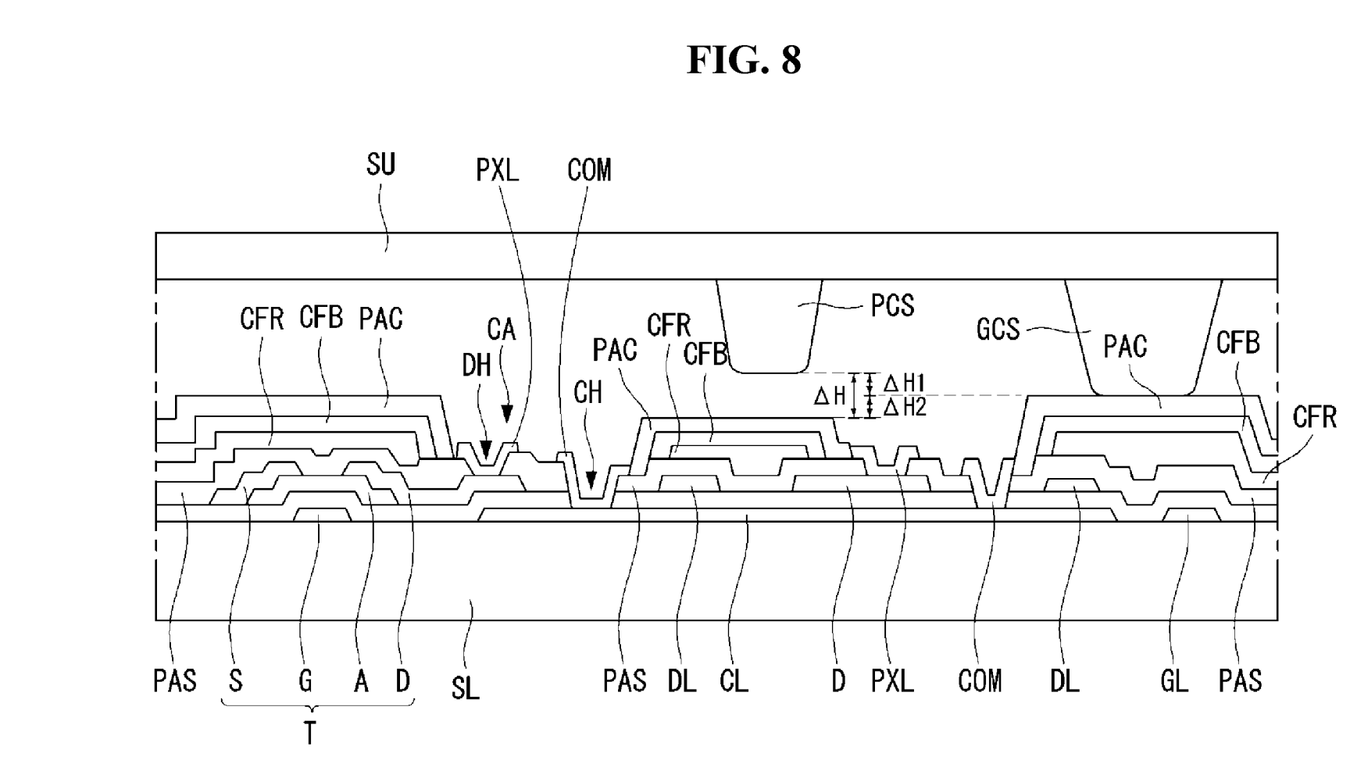
FIG. 8 is a cross-sectional view, along line II-IF of FIG. 6, illustrating a structure of a gap spacer and a push spacer in a liquid crystal display according to an embodiment.

Hereinafter, according to an embodiment, there is described an example in which the color filter may be formed on the lower substrate with the thin film transistor in the ultra high density liquid crystal display including greater than 300 ppi resolution, and the gap column spacer GCS and the push column spacer PCS may be effectively disposed. FIG. 6 is a plane view illustrating a structure of a liquid crystal display according to an embodiment. FIG. 7 is a plane view illustrating a structure of color filter array in a liquid crystal display according to an embodiment. FIG. 8 is a cross-sectional view, along the line II-IF of FIG. 6, illustrating a structure of a gap spacer and a push spacer in a liquid crystal display according to an embodiment.

With reference to FIGS. 6 and 8, the liquid crystal display according to the second embodiment of the present disclosure may have a lower substrate SL having a thin film transistor T. On the thin film transistor, a passivation layer PAS is deposited as covering the whole surface of the lower substrate SL. On the passivation layer PAS, a color filter may be formed within a pixel area. For example, the red color filters CFR allocated at red subpixels may be disposed along one column, and the green color filters CFG may be disposed along the next column. Further, the blue color filters CFB may be disposed along the next column after the green color filters CFG.

A plurality of pixel areas may be defined as being disposed in a matrix manner on the lower substrate SL. A thin film transistor T may be disposed on one side within a pixel area. A pixel electrode PXL connected to the thin film transistor T may be formed within the aperture area of the pixel area. For the horizontal electric field type, the pixel electrode PXL may include a plurality of vertical pixel electrodes PXLv having a segment shape, disposed parallel to one another, and separated from each other by a predetermined distance. The pixel electrode PXL may also include a horizontal pixel electrode PXLh connecting all of the vertical pixel electrodes PXLv. Further, a plurality of vertical common electrodes COMv, parallel with each of the horizontal pixel electrodes PXLv, may be formed within the pixel area.

On the upper surface of the lower substrate SL including the thin film transistor T, the pixel electrode PXL, and the common electrode COM, and a passivation layer PAS may be deposited to cover an entire surface of the lower substrate SL. On the passivation layer PAS, a plurality of color filters CFR, CFG, CFB may be formed such that each color filter may be allocated to each pixel area. On the upper surface of the lower substrate SL including the color filter, a planarization layer PAC may be deposited to cover the entire surface of the lower substrate SL.

In an example in which the color filter is formed on the lower substrate SL, in order to simplify the manufacturing method, the black matrix BM may not be formed. Instead of the black matrix BM, two or more color filters may be overlapped to block the light leakage by forming a stack structure. For example, at an area where the black matrix may be desired, the red color filter CFR and the blue color filter CFB may be stacked to form a substitute for the black matrix BM.

For one example, the red color filter CFR, the green color filter CFG, and the blue color filter CFB may be stacked to form a substitute for the black matrix BM. However, this three layer stacked structure may cause severe level differences, and may cause other side effects. Therefore, embodiments may include forming a substitute for the black matrix BM by stacking any two color filters among the red, the green, and the blue color filters. In one example, in order to obtain a function closer to that of the black matrix BM, the red-blue combination may provide a better result, among the red-green, the green-blue, and the red-blue combinations.

For example, as shown in FIG. 7, at first, the red color filter CFR may be formed. The red color filter CFR may be formed over the area where the red pixel area and the black matrix area are located. Here, the "red pixel area" corresponds to an aperture area of a pixel area for representing a red color. The "line area" corresponds to the non-aperture area surrounding the aperture area in the pixel area. In FIG. 7, the inner area surrounded by the solid line may be the area where the red color filter CFR is formed. The area for the red color filter CFR is illustrated in FIG. 7 as an upper right to lower left diagonal hatch pattern.

After that, the blue color filter CFB may be formed. In one example, the blue color filter CFB may be formed to cover the blue pixel area and all of the non-aperture area where the black matrix is desired. For instance, where the red color filter and the blue color filter are overlapped, in one example, the blue color filter CFB may be wider than the red color filter CFR. As a result, as shown in FIG. 8, at the non-aperture area where the black matrix is desired, the blue color filter CFB may perfectly cover or may overspread the red color filter CFR. In the FIG. 7 illustration, the inner area surrounded by the bold solid line is the area where the blue color filter CFB is formed. The area for blue color filter CFB is illustrated as a upper left to lower right diagonal hatch pattern.

Therefore, at the non-aperture area where the black matrix is formed in the related art—especially, where the gate line GL, the common line CL, and the thin film transistor T are formed—the red color filter CFR and the blue color filter CFB are deposited. In the FIG. 7 example, the non-aperture area is represented as having two hatch patterns for red color filter CFR and the blue color filter CFB at the same time (e.g., where the different-directioned lines cross).

In addition, in one embodiment, the green color filter CFG may be formed only at the green pixel area. In the FIG. 7 illustration, the area having no hatch pattern represents the area for the green color filter CFG. Here, at the contact hole area CA, thre may be no color filter deposited.

In the liquid crystal display according to an embodiment, the gap column spacer GCS and the push column spacer PCS may be formed at an area of the upper substrate SU corresponding to an area where the red color filter CFR and the blue color filter CFB are formed to overlap. As explained above, in the case of the ultra high density liquid crystal display graeter than 300 ppi resolution as shown in FIG. 6, the size of the unit pixel may decrease. Further, the distance between the drain contact hole DH and the common contact hole CH may decrease.

However, as shown in FIG. 6, by disposing the drain contact hole DH and the common contact hole CH closer to each other, these two contact holes DH and CH may be disposed within one contract area CA. As a result, the distance between neighboring two contact area CA may be greater than 32 μm (micrometers), e.g., 35~50 μm (micrometers). Therefore, it may be possible to obtain enough space to dispose the gap column spacer GCS and/or the push column spacer PCS between two neighboring contact areas CA.

In addition, there may be a height difference between the gap column spacer GCS and the push column spacer PCS. That is, in an embodiment in which the color filter is formed on the lower substrate SL with the thin film transistor, the following condition may be considered.

In one embodiment, the gap column spacer GCS and the push column spacer PCS may be formed on the upper substrate SU. As mentioned above, two color filters may be overlapped to form a substitute for the black matrix BM of the FIG. 4 example; therefore, the upper substrate SU in the FIG. 8 example may not include the black matrix. However, even thouh it is not shown in figures, at a bezel area surrounding the upper substrate SU at an outermost boundary, a black resin material may be deposited and patterned to form a black bezel. In order to simplify the manufacturing process, the gap column spacer GCS and the push column spacer PCS may be formed with the black bezel.

For example, a black resin material may be deposited on the inner surface of the upper substrate SU, in the display area, and then the gap column spacer GCS having the first height and the push column spacer PCS having the second height may be formed using one half-tone mask. At the same time, at the bezel area, the same black resin material may be deposited, and then the black bezel may be formed. The display area includes a plularity of pixels, and the bezel area surrounds the display area. The black bezel may have any height that is the same as that of the gap column spacer GCS or the push column spacer PCS. However, when the half-tone mask process is applied to the black resin material, it may be difficult to obtain a precisely desired height difference $\Delta H$ between the first height and the second height, e.g., 6,000~7,000 Å.

When depositing a black resin material and then patterning the gap column spacer GCS and the push column spacer PCS at the same time using the half-tone mask, the possible height difference may be 3,000~4,000 Å, at most. Therefore, it may be desirable to achieve an additional 2,000~4,000 Å of the height difference to reach the desired 6,000~7,000 Å total desired height difference ΔH.

As mentioned above with respect to the FIG. 6 example, this problem may be solved by changing the structure such that the drain contact hole DH and the common contact hole CH may be disposed much closer, such that one contact area CA has the two contact holes. The solution may be obtained as follows. The total height (or, thickness) of the stacked red color filter CFR and the blue color filter CFB at the area between the two neighboring contact hole area CA may be about 2,000~3,000 Å less (e.g., lower or thinner) than the total height of the stacked color filter deposited at the other areas.

By the separation distance between the two neighboring contact hole areas CA to be less than 50 μm (micrometers), the thickness of the stacked red color filter CFR and the blue color filter CFB at the area between the two neighboring contact hole areas CA may be thinner than other areas further from the contact hole area CA. This thinned amount of the thickness may be controlled by adjusting the separation distance between the two neighboring contact hole areas CA. Further, with this structure, it may be possible to maintain the contact hole area separation distance to be more than 35 μm (micrometers), even if the display panel has a 300 ppi or higher resolution density. Therefore, by controlling the separation distance of the neighboring contact hole areas CA within the range of 35~50 μm (micrometers), the required additional height difference between the gap column spacer GCS and the push column spacer PCS may be compensated.

For example, the push column spacer PCS may be disposed between the two neighboring contact hole areas CA, and the gap column spacer GCS may be disposed on the gate line GL where there is no contact area CA nearby. As a result, the push column spacer PCS and the gap column spacer GCS formed on the upper substrate SU using the half-tone mask may have the first height difference ΔH1, e.g., 3,000~4,000 Å. That is, the height difference between the top surface of the push column spacer PCS and the top surface of the gap column spacer GCS may be the first height difference ΔH1, e.g., 3,000~4,000 Å.

In addition, the second height difference ΔH2, e.g., 2,000~3,000 Å, may be further ensured by the thickness difference between the thickness of stacked red color filter CFR and the blue color filter CFB deposited at the between area of the two neighboring contact hole areas CA and the thickness of the stacked red color filter CFR and the blue color filter CFB deposited further from the contact hole area CA. As a result, the desired total height difference ΔH of 6,000~7,000 Å may be achieved between the upper surface of the push column spacer PCS and upper surface of the lower substrate SL.

In an embodiment, even though the actual height difference between the push column spacer PCS and the gap column spacer GCS may not be sufficient, the separation distance of the push column spacer PCS from the upper surface of the lower substrate SL may be obtained by controlling the thickness of the color filter(s) according to the deposited position of the spacers on the lower substrate SL. For example, by controlling the distance between two neighboring contact hole areas CA within 35~50 μm (micrometers), the stacked thickness of the color filters on the non-aperture area between the two neighboring contact hole areas may be controlled to be different from the stacked thickness of the color filters on the non-aperture area further from the contact hole area CA. Therefore, without any specially added mask process, the height difference of the push column spacer PCS may be exactly controlled.

In one embodiment, a predetermined distance between two neighboring contact hole areas is 35~50 μm (micrometers), and the push column spacer may be disposed between the two neighboring contact hole areas.

In one embodiment, an upper surface of the gap column spacer may contact a top inner surface of the lower substrate, and an upper surface of the push column spacer may be separated by 6,000~7,000 Å from the top inner surface of the lower substrate.

In one embodiment, the gap column spacer may have a first height, the push column spacer may have a second height 3,000~4,000 Å less than the first height, and a first stacked height of the first color filter, and the second color filter overlapped at the non-aperture area corresponding to the push column spacer may be 2,000~3,000 Å less than a second stacked height of the first color filter and the second color filter at the non-aperture area corresponding to the gap column spacer.

In one embodiment, the lower substrate may include a third color filter disposed at the aperture area of a third subpixel, the first color filter may be a red color filter, the second color filter may be a blue color filter, and the third color filter may be a green color filter.

In one embodiment, the non-aperture area of the lower substrate may include: a gate line and a common line running to a first direction of the lower substrate, a data line running to a second direction of the lower substrate, and a thin film transistor connected to the gate line and the data line. The aperture ratio of the lower substrate may further include: a pixel electrode connecting to the thin film transistor and including a plurality of segments separated from each other, and a common electrode including a plurality of segments parallel to the each segment of the pixel electrode.

In one embodiment, the contact hole area may include a drain contact hole connecting the thin film transistor to the pixel electrode.

In one embodiment, the contact hole area may include a common contact hole connecting the common electrode to the common line.

In one embodiment, the upper substrate may include a black bezel surrounding the upper substrate at the outermost edge, and the gap column space and the push column spacer may include the same material of the black bezel.

The liquid crystal display according to an embodiment may include a gap spacer for keeping the gap of the liquid crystal layer sandwiched between the upper substrate and the lower substrate, and a push spacer for preventing the gap of the liquid crystal layer from being severely thinned by the external pressing force. Therefore, any distortion of the display quality due to the pressing force applied on the display surface may be prevented. Further, the height difference between the gap spacer and the push spacer may be exactly designed and controlled as the color filter and the thin film transistor may be formed on one substrate and the gap and push spacers may be formed on the other substrate.

Although embodiments have been described with reference to a number of illustrative embodiments thereof, it should be understood that numerous other modifications and embodiments may be devised by those skilled in the art that will fall within the spirit and scope of the principles of this disclosure. For example, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device, comprising:
    a lower substrate, comprising:
        a plurality of pixel areas disposed in a matrix manner;
        a non-aperture area surrounding at least one of the pixel areas;
        an aperture area surrounded by the non-aperture area;
        a contact hole area within the non-aperture area;
        a first color filter disposed on the non-aperture area and the aperture area of a first subpixel, except in the contact area; and
        a second color filter disposed on the non-aperture area and the aperture area of a second subpixel, except in the contact area;
    an upper substrate, comprising, at the non-aperture area:
        a gap column spacer; and
        a push column spacer; and
    a liquid crystal layer disposed between the lower substrate and the upper substrate,
    wherein the non-aperture area of the lower substrate further comprises:
        a gate line and a common line disposed in a first direction of the lower substrate,
        a data line disposed in a second direction of the lower substrate, and
        a thin film transistor connected to the gate line and the data line, and
    wherein the aperture area of the lower substrate further comprises:
        a pixel electrode connected to the thin film transistor and comprising a plurality of segments separated from each other, and
        a common electrode comprising a plurality of segments parallel to each segment of the pixel electrode.

2. The device of claim 1, wherein:
    a distance between two neighboring contact hole areas is 35~50 μm (micrometers); and
    the push column spacer is disposed between the two neighboring contact hole areas.

3. The device of claim 1, wherein:
    an upper surface of the gap column spacer contacts a top inner surface of the lower substrate; and
    an upper surface of the push column spacer is separated from the top inner surface of the lower substrate by 6,000~7,000 Å.

4. The device of claim 3, wherein:
    the gap column spacer has a first height;
    the push column spacer has a second height 3,000~4,000 Å less than the first height; and
    at the non-aperture area, a first stacked height of a first overlap area of the first color filter and the second color filter, corresponding to the push column spacer, is 2,000~3,000 Å less than a second stacked height of a second overlap area of the first color filter and the second color filter, corresponding to the gap column spacer.

5. The device of claim 1, wherein:
    the lower substrate further comprises a third color filter disposed at an aperture area of a third subpixel;
    the first color filter comprises a red color filter;
    the second color filter comprises a blue color filter; and
    the third color filter comprises a green color filter.

6. The device of claim 1, wherein the contact hole area comprises a drain contact hole connecting the thin film transistor to the pixel electrode.

7. The device of claim 1, wherein the contact hole area comprises a common contact hole connecting the common electrode to the common line.

8. The device of claim 1, wherein:
    the upper substrate further comprises a black bezel surrounding the upper substrate at the outermost edge; and
    the gap column spacer and the push column spacer comprise a same material as the black bezel.

9. A method of manufacturing a liquid crystal display device, the method comprising:
    providing a lower substrate, comprising:
        providing a plurality of pixel areas in a matrix manner;
        providing a non-aperture area surrounding at least one of the pixel areas;
        providing an aperture area surrounded by the non-aperture area;
        providing a contact hole area within the non-aperture area;
        providing a first color filter on the non-aperture area and the aperture area of a first subpixel, except in the contact area; and
        providing a second color filter on the non-aperture area and the aperture area of a second subpixel, except in the contact area;
    providing an upper substrate comprising, at the non-aperture area:
        providing a gap column spacer; and
        providing a push column spacer; and
    providing a liquid crystal layer between the lower substrate and the upper substrate,
    wherein providing the non-aperture area of the lower substrate further comprises:
        providing a gate line and a common line in a first direction of the lower substrate,
        providing a data line in a second direction of the lower substrate, and
        providing a thin film transistor connected to the gate line and the data line, and
    wherein providing the aperture area of the lower substrate further comprises:
        providing a pixel electrode connected to the thin film transistor and comprising a plurality of segments separated from each other, and
        providing a common electrode comprising a plurality of segments parallel to each segment of the pixel electrode.

10. The method of claim 9, wherein:
    a distance between two neighboring contact hole areas is 35~50 μm (micrometers); and
    the push column spacer is provided between the two neighboring contact hole areas.

11. The method of claim 9, wherein:
    an upper surface of the gap column spacer is provided to contact a top inner surface of the lower substrate; and
    an upper surface of the push column spacer is provided to be separated from the top inner surface of the lower substrate by 6,000~7,000 Å.

12. The method of claim 11, wherein:
    the gap column spacer has a first height;
    the push column spacer has a second height 3,000~4,000 Å less than the first height; and
    at the non-aperture area, a first stacked height of a first overlap area of the first color filter and the second color filter, corresponding to the push column spacer, is 2,000~3,000 Å less than a second stacked height of a second overlap area of the first color filter and the second color filter, corresponding to the gap column spacer.

13. The method of claim 9, wherein:
providing the lower substrate further comprises providing a third color filter disposed at an aperture area of a third subpixel;
providing the first color filter comprises providing a red color filter;
providing the second color filter comprises providing a blue color filter; and
providing the third color filter comprises providing a green color filter.

14. The method of claim 9, wherein providing the contact hole area comprises providing a drain contact hole connecting the thin film transistor to the pixel electrode.

15. The method of claim 9, wherein providing the contact hole area comprises providing a common contact hole connecting the common electrode to the common line.

16. The method of claim 9, wherein:
providing the upper substrate further comprises providing a black bezel surrounding the upper substrate at the outermost edge; and
the gap column spacer and the push column spacer comprise a same material as the black bezel.

17. A liquid crystal display device, comprising:
a lower substrate, comprising:
 a plurality of pixel areas disposed in a matrix manner;
 a non-aperture area surrounding at least one of the pixel areas;
 an aperture area surrounded by the non-aperture area;
 a contact hole area within the non-aperture area;
 a first color filter disposed on the non-aperture area and the aperture area of a first subpixel, except in the contact area; and
 a second color filter disposed on the non-aperture area and the aperture area of a second subpixel, except in the contact area;
an upper substrate, comprising, at the non-aperture area:
 a gap column spacer; and
 a push column spacer; and
a liquid crystal layer disposed between the lower substrate and the upper substrate,
wherein the upper substrate further comprises a black bezel surrounding the upper substrate at the outermost edge,
wherein the gap column spacer and the push column spacer comprise a same material as the black bezel, and
wherein the gap column spacer and the push column spacer are on a same surface of the upper substrate as the black bezel.

18. The device of claim 17, wherein:
a distance between two neighboring contact hole areas is 35~50 μm (micrometers); and
the push column spacer is disposed between the two neighboring contact hole areas.

19. The device of claim 17, wherein:
an upper surface of the gap column spacer contacts a top inner surface of the lower substrate; and
an upper surface of the push column spacer is separated from the top inner surface of the lower substrate by 6,000~7,000 Å.

20. The device of claim 17, wherein:
the gap column spacer has a first height;
the push column spacer has a second height 3,000~4,000 Å less than the first height; and
at the non-aperture area, a first stacked height of a first overlap area of the first color filter and the second color filter, corresponding to the push column spacer, is 2,000~3,000 Å less than a second stacked height of a second overlap area of the first color filter and the second color filter, corresponding to the gap column spacer.

* * * * *